(12) United States Patent
Chien

(10) Patent No.: US 9,851,515 B1
(45) Date of Patent: Dec. 26, 2017

(54) RECEPTACLE FOR TRANSCEIVER OPTICAL SUB-ASSEMBLY

(71) Applicant: OPTOWAY TECHNOLOGY INC., Hsin Chu (TW)

(72) Inventor: Eddy Chien, Hsin Chu (TW)

(73) Assignee: Optoway Technology Inc., Hsinchu (TW)

( * ) Notice: Subject to any disclaimer, the term of this patent is extended or adjusted under 35 U.S.C. 154(b) by 0 days.

(21) Appl. No.: 15/645,333

(22) Filed: Jul. 10, 2017

(51) Int. Cl.
*G02B 6/42* (2006.01)

(52) U.S. Cl.
CPC .......... *G02B 6/4226* (2013.01); *G02B 6/422* (2013.01); *G02B 6/4215* (2013.01); *G02B 6/4219* (2013.01); *G02B 6/4228* (2013.01); *G02B 6/4246* (2013.01); *G02B 6/4292* (2013.01)

(58) Field of Classification Search
CPC G02B 6/2938; G02B 6/29361; G02B 6/4204; G02B 6/4215; G02B 6/4219; G02B 6/422; G02B 6/4226; G02B 6/4233; G02B 6/4234; G02B 6/4246; G02B 6/4292

USPC ..................................................... 385/88–94
See application file for complete search history.

(56) References Cited

U.S. PATENT DOCUMENTS

2006/0088255 A1\* 4/2006 Wu ..................... G02B 6/2938
385/92

\* cited by examiner

*Primary Examiner* — Akm Enayet Ullah
*Assistant Examiner* — Michael Mooney
(74) *Attorney, Agent, or Firm* — Muncy, Geissler, Olds & Lowe, P.C.

(57) ABSTRACT

A receptacle for transceiver optical sub-assembly is configured for optical elements such as a light-emitting unit, a light guide unit, a light-receiving unit and a filter to connect thereto. The receptacle includes a lower receptacle body having a through bore, to which the light-emitting unit is connected; and an upper receptacle body having an axial receiving bore, to which the light guide unit is connected. The upper and the lower receptacle body are movable relative to each other in the x-y plane. The lower receptacle body can be moved relative to the upper receptacle body until an optical signal emitted from the light-emitting unit is optically coupled and collimated with an optical fiber in the light guide unit, and then the upper and lower receptacle bodies are fixedly connected together.

1 Claim, 6 Drawing Sheets

RECEPTACLE FOR TRANSCEIVER OPTICAL SUB-ASSEMBLY

FIELD OF THE INVENTION

The present invention relates to a receptacle for transceiver optical sub-assembly.

BACKGROUND OF THE INVENTION

In an optical fiber communication system, the transceiver optical sub-assembly is an important medium for conversion between optical signals and electrical signals. There are different types of transceiver optical sub-assemblies, including a transmitter optical sub-assembly (TOSA) for transmitting optical signals, a bidirectional optical sub-assembly (BOSA) for bidirectional transmission of optical signals over one single optical fiber, and a tri-directional optical sub-assembly (TRI-DI OSA) for simultaneously receiving a digital signal and an analog signal and transmitting a digital signal. In FIG. 1, there is illustrated a BOSA. The BOSA includes a receptacle body 10, to which a light-emitting unit 11 and a light guide structure 12 are connected. The light-emitting unit 11 is located on a central axis of the receptacle body 10. The light-emitting unit 11 and the light guide structure 12 are optically aligned and coupled in precision. The light guide structure 12 can be divided into two types, namely, a pigtail type and a receptacle type. In FIG. 1, there is illustrated a pigtail type light guide structure.

In the receptacle body 10, there is installed a filter 13. The optical signal emitted from the light-emitting unit 11 is refracted by the filter 13 to change its incident direction, as indicated by the arrows A1, A2 in FIG. 1, so that the focusing position of the optical signal is also changed. Therefore, the light guide structure 12 must be shifted in x-axis, y-axis and z-axis directions for optical collimation, so that the optical signal A2 of the light-emitting unit 11 and an optical fiber 14 held in the light guide structure 12 can be optically coupled and aligned with each other. Then, the light guide structure 12 is fixedly connected to the receptacle body 10 using a laser welding apparatus. However, when the laser welding is completed, the light guide structure 12 tends to warp due to thermal expansion. As a result, the light guide structure 12 is prevented from being fully connected to the receptacle body 10 and a gap S is formed between the light guide structure 12 and the receptacle body 10. This condition will cause optical power shift to result in optical power loss.

SUMMARY OF THE INVENTION

A primary object of the present invention is to solve the problems in the prior art by providing a receptacle for transceiver optical sub-assembly that includes an upper and a lower receptacle body, on which different optical elements are installed. The upper and the lower receptacle body of the receptacle are movable relative to each other via an x-y moving platform until optical coupling and collimation between the optical elements on the two receptacle bodies is achieved. At this point, the upper and lower receptacle bodies are fixedly connected together.

To achieve the above and other objects, the receptacle for transceiver optical sub-assembly according to the present invention includes a lower receptacle body and an upper receptacle body. The lower receptacle body has an upper end and a lower end and internally defines a through bore, in which a light-emitting unit is installed from the lower end of the lower receptacle body. The lower receptacle body further includes an upper flange portion upward extended from and along an outer edge of the upper receptacle body to thereby form a first curved groove between the upper flange portion and the upper end of the lower receptacle body. The upper receptacle body has a filter installed therein, and has an upper end and a lower end. The upper receptacle body includes a second curved groove formed on around an outer wall surface thereof near the lower end at a position corresponding to the upper flange portion of the lower receptacle body, such that a lower flange portion is formed between the second curved groove and the lower end of the upper receptacle body at a position corresponding to the first curved groove on the lower receptacle body. The upper receptacle body defines an axial receiving opening, to which a front end portion of a light guide unit is connected. The upper and the lower receptacle body of the receptacle can be moved relative to each other until optical coupling and collimation between an optical signal emitted from the light-emitting unit and an optical fiber in the light guide unit is achieved. At this point, the upper and lower receptacle bodies are fixedly connected together.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof and by referring to the accompanying drawings.

Figure 1:
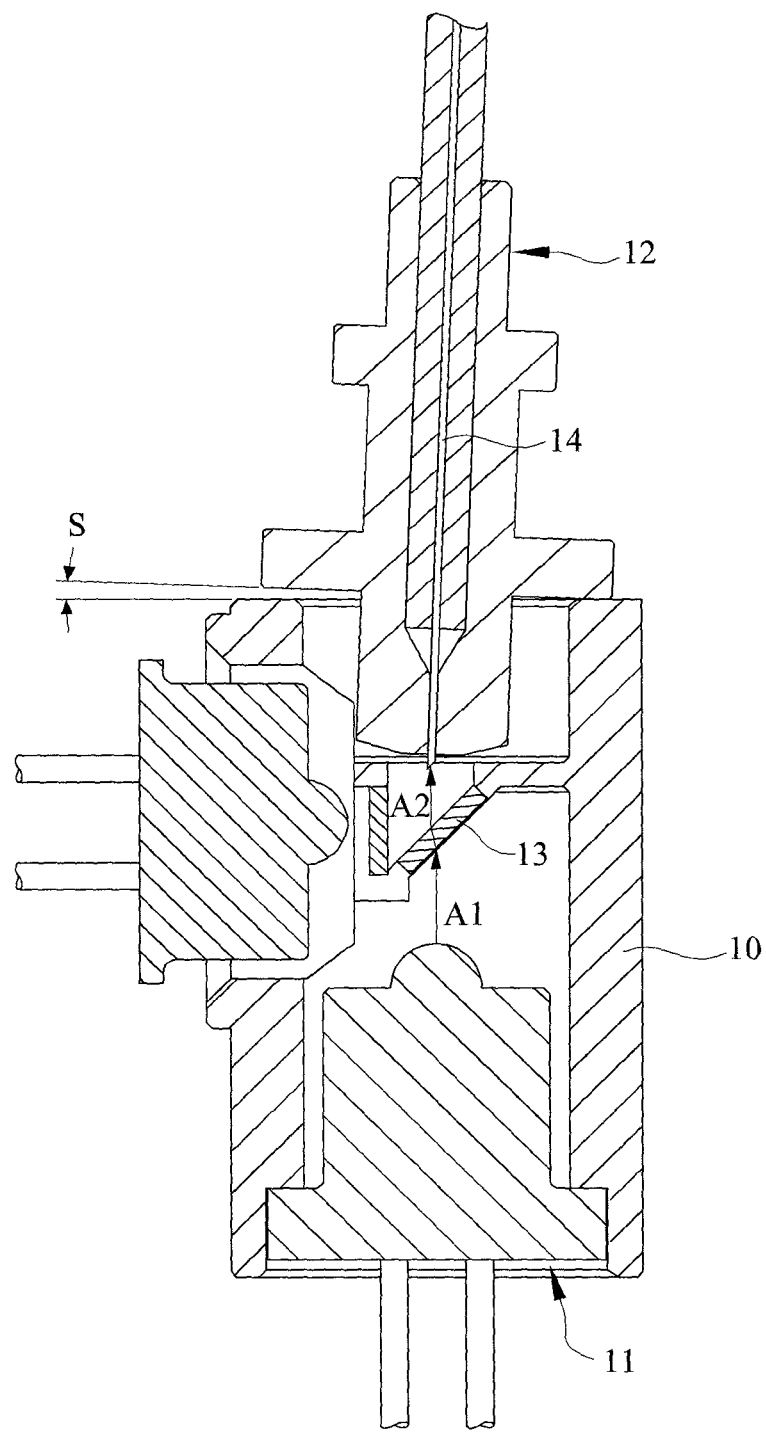
FIG. 1 is a sectional view of a conventional transceiver optical sub-assembly.
Figure 2:
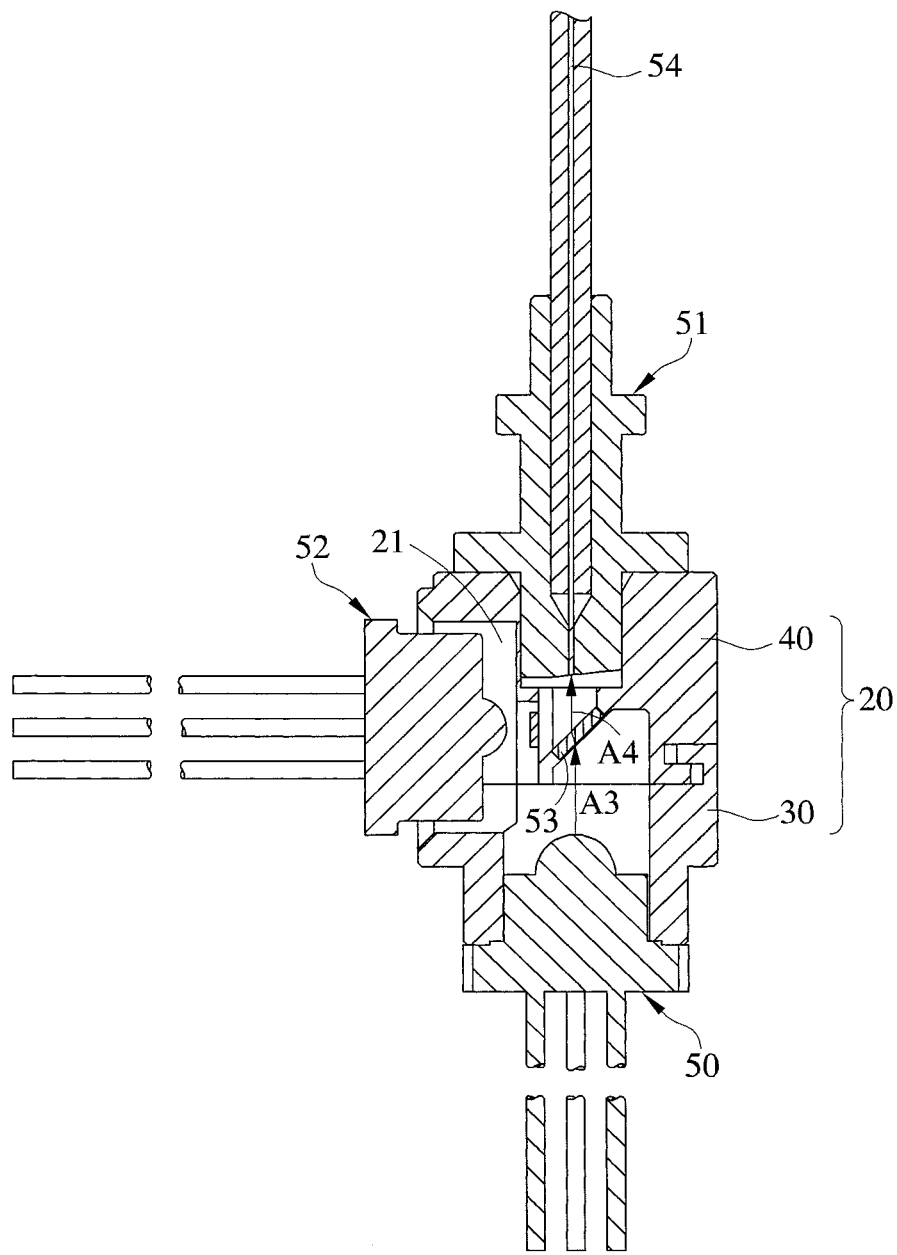
FIG. 2 is a sectional view showing a receptacle for transceiver optical sub-assembly according to a preferred embodiment of the present invention has a light-emitting unit and a light guide unit connected thereto with an optical signal emitted from the light-emitting unit and an optical fiber in the light guide unit optically coupled and collimated with each other.

Please refer to FIG. 2. A receptacle for transceiver optical sub-assembly according to a preferred embodiment of the present invention can have optical elements such as a light-emitting unit 50, a light guide unit 51, a light-receiving unit 52 and a filter 53 installed thereon. For the purpose of conciseness and clarity, the receptacle for transceiver optical sub-assembly according to the present invention is herein generally denoted by reference numeral 20 and also briefly referred to as the receptacle 20. As shown, the receptacle 20 includes a lower receptacle body 30, to which the light-emitting unit 50 is connected, and an upper receptacle body 40, to which the light guide unit 51 is connected. The filter 53 is installed in the upper receptacle body 40. The lower receptacle body 30 and the upper receptacle body 40 together define a sideward receiving opening 21 between them, and the light-receiving unit 52 is installed in the receiving opening 21. In FIG. 2, the transceiver optical sub-assembly is illustrated as a bidirectional optical sub-assembly (BOSA), and the light guide unit is illustrated as a pigtail type light guide unit 51.

Figure 3:
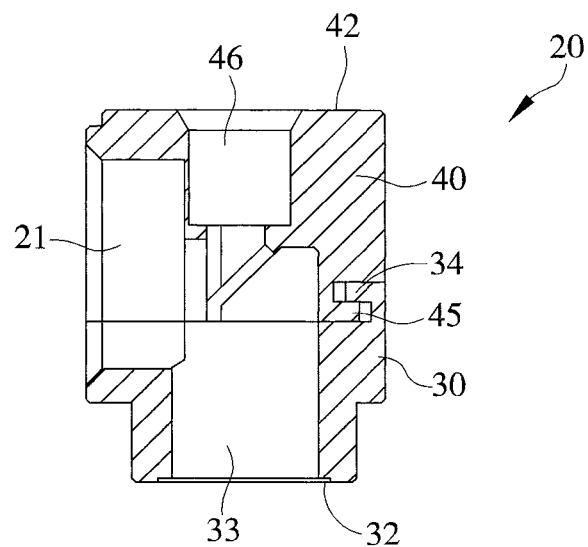
FIG. 3 is an assembled sectional view of the receptacle for transceiver optical sub-assembly according to the preferred embodiment of the present invention.
Figure 4:
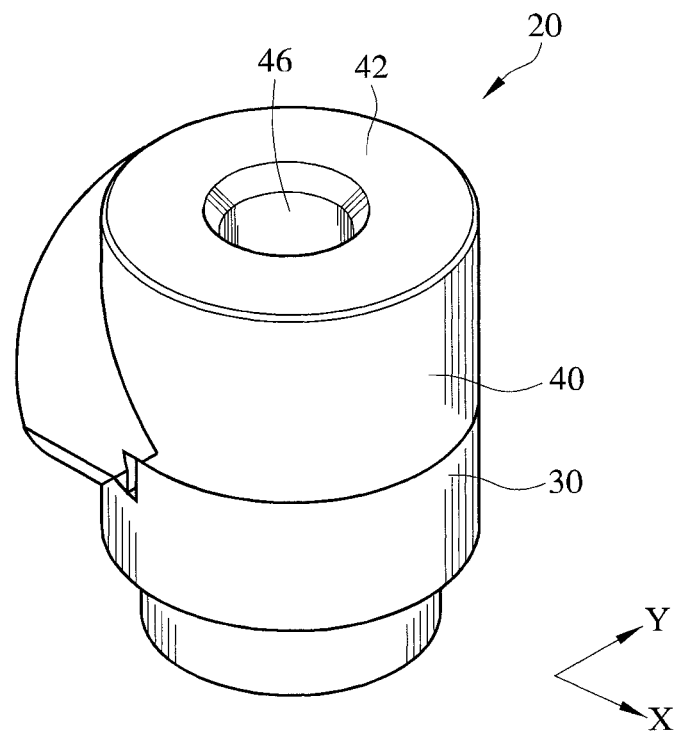
FIG. 4 is an assembled perspective view of the receptacle for transceiver optical sub-assembly according to the preferred embodiment of the present invention.
Figure 5:
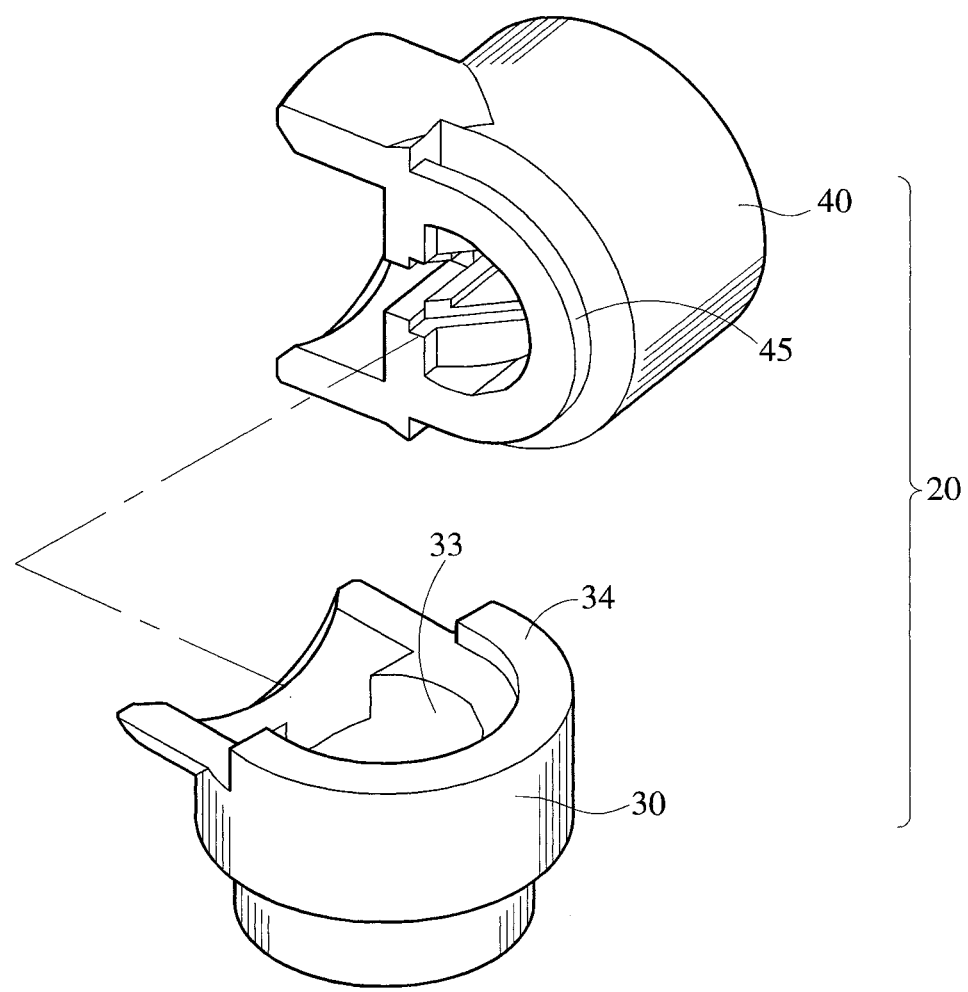
FIG. 5 is an exploded view of FIG. 4.
Figure 6:
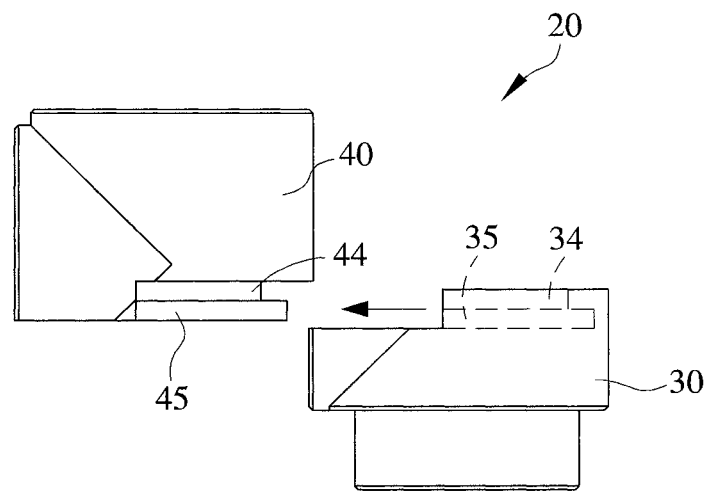
FIG. 6 is an exploded elevation view of the receptacle for transceiver optical sub-assembly according to the preferred embodiment of the present invention.
Figure 7:
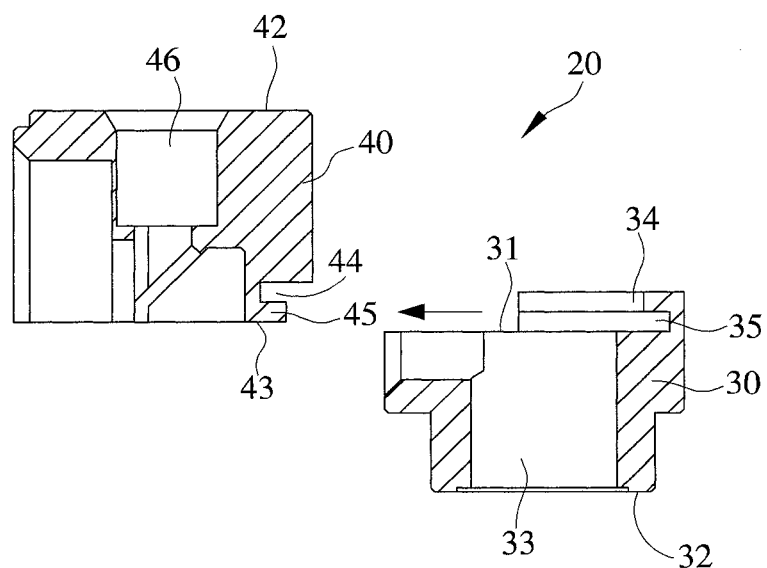
FIG. 7 is a sectional view of FIG. 6.

Please refer to FIGS. 3 to 7. The lower receptacle body 30 and the upper receptacle body 40 are sideward inserted into each other, as shown in FIGS. 6 and 7, to form an assembled receptacle 20, as shown in FIGS. 3 and 4. The lower receptacle body 30 has an upper end 31 and a lower end 32, and internally defines a through bore 33. The light-emitting unit 50 is installed in the through bore 33 from the lower end 32 of the lower receptacle body 30, as shown in FIG. 2. An upper flange portion 34 is upward extended from and along an outer edge of the upper end 31 of the lower receptacle body 30, such that a first curved groove 35 is formed between the upper flange portion 34 and the upper end 31 of the lower receptacle body 30.

The upper receptacle body 40 has an upper end 42 and a lower end 43. A second curved groove 44 is formed on around an outer wall surface of the upper receptacle body 40 near the lower end 43 at a position corresponding to the upper flange portion 34 of the lower receptacle body 30, such that a lower flange portion 45 is formed between the second curved groove 44 and the lower end 43 of the upper receptacle body 40 at a position corresponding to the first curved groove 35 on the lower receptacle body 30. The upper receptacle body 40 defines an axial receiving opening 46. A front end portion of the light guide unit 51 is connected to the receiving opening 46, as shown in FIG. 2. Substantially, the upper flange portion 34 is freely movable in the second curved groove 44, and the lower flange portion 45 is freely movable in the first curved groove 35. In other words, the lower receptacle body 30 and the upper receptacle body 40 are movable relative to each other in the x-y plane. Therefore, when the lower receptacle body 30 is inserted into the upper receptacle body 40, the upper flange portion 34 is located in the second curved groove 44 and the lower flange portion 45 is located in the first curved groove 35, allowing the lower receptacle body 30 and the upper receptacle body 40 to move relative to each other in the x-y plane, as indicated by the x-axis and y-axis in FIG. 4.

Figure 8:
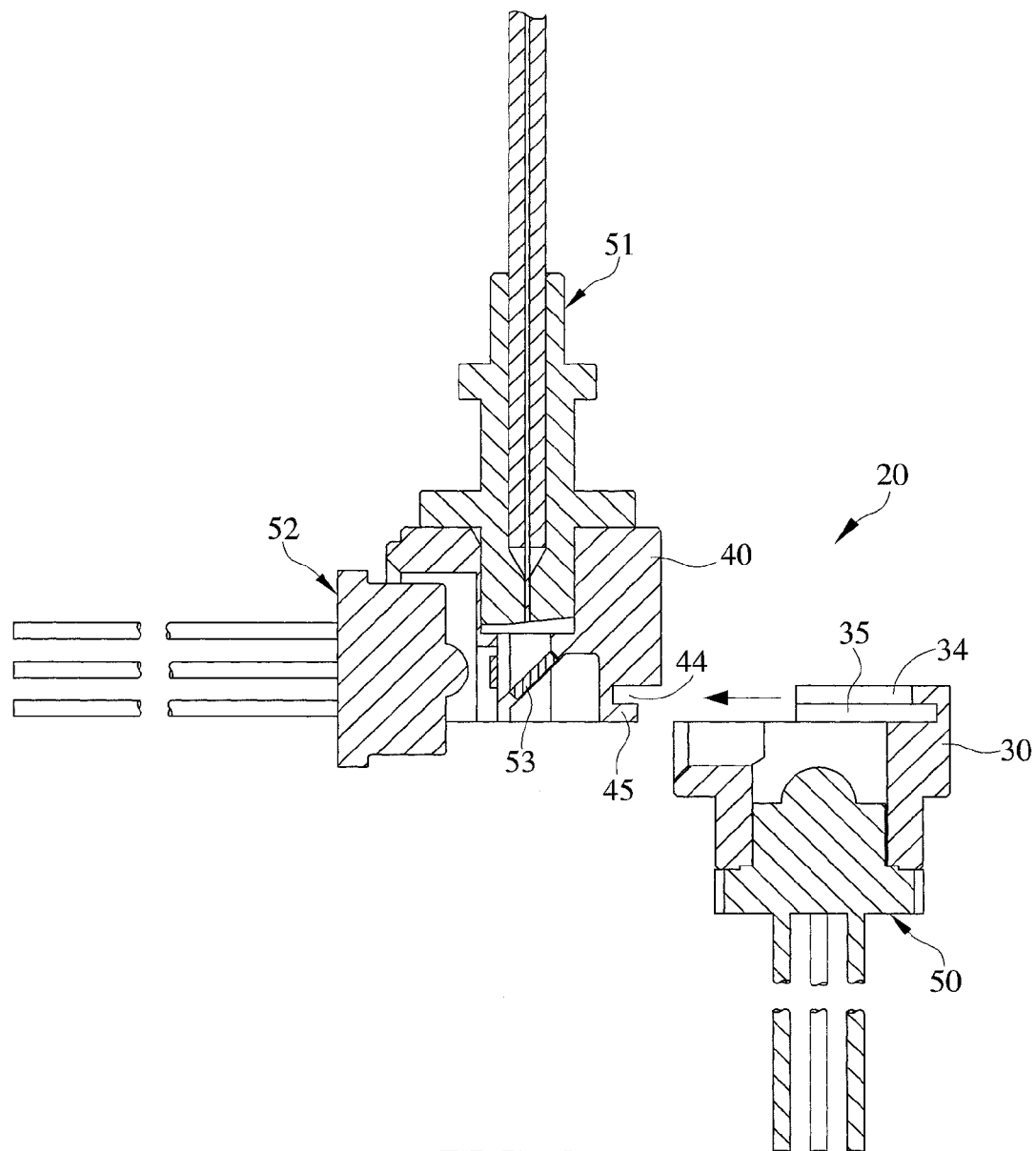
FIG. 8 is an exploded sectional view showing the manner of assembling a lower receptacle body to an upper receptacle body of the receptacle for transceiver optical sub-assembly according to the preferred embodiment of the present invention; wherein different optical elements are installed on the upper and the lower receptacle body before the assembling.

Please refer to FIG. 8. Before assembling the lower receptacle body 30 to the upper receptacle body 40, first fit the light-emitting unit 50 in the through bore 33 of the lower receptacle body 30 and fit the light guide unit 51 in the receiving opening 46 of the upper receptacle body 40. Thereafter, use an x-y moving platform (not shown) to enable optical collimation between the light-emitting unit 50 and the light guide unit 51. For example, the lower receptacle body 30 can be set to be a movable end and the upper receptacle body 40 a stationary end. The lower receptacle body 30 is moved by the moving platform for an optical-plane adjustment, i.e. for an adjustment in the x-y plane, until an optical signal emitted from the light-emitting unit 50 is optically coupled and collimated with an optical fiber 54 in the light guide unit 51, as the incident directions indicated by arrows A3, A4 in FIG. 2. Finally, the upper receptacle body 40 is fixedly connected to the lower receptacle body 30 by laser beam welding or gluing.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A receptacle for transceiver optical sub-assembly, being configured for connecting with optical elements, including a light-emitting unit, a light guide unit having an optical fiber held therein, a filter and the like, the receptacle comprising:
    a lower receptacle body having an upper end and a lower end and internally defining a through bore; the light-emitting unit being installed in the through bore from the lower end of the lower receptacle body; and the lower receptacle body further including an upper flange portion upward extended from and along an outer edge of the lower receptacle body to thereby form a first curved groove between the upper flange portion and the upper end of the lower receptacle body; and
    an upper receptacle body, in which the filter is installed; the upper receptacle body having an upper end and a lower end and including a second curved groove formed on around an outer wall surface thereof near the lower end at a position corresponding to the upper flange portion of the lower receptacle body, such that a lower flange portion is formed between the second curved groove and the lower end of the upper receptacle body at a position corresponding to the first curved groove on the lower receptacle body; and the upper receptacle body defining an axial receiving opening, to which a front end portion of the light guide unit is connected; and
    the upper flange portion being freely movable in the second curved groove and the lower flange portion being freely movable in the first curved groove to allow the lower and the upper receptacle body to move relative to each other in the x-y plane;
    whereby when the lower receptacle body is sideward inserted into the upper receptacle body, the upper flange portion is located in the second curved groove and the lower flange portion is located in the first curved groove; and the lower receptacle body is movable relative to the upper receptacle body until an optical signal emitted from the light-emitting unit is optically coupled and collimated with the optical fiber in the light guide unit; and at this point, the upper and the lower receptacle body are fixedly connected to each other.

* * * * *